United States Patent
Vasudevan et al.

(10) Patent No.: US 8,041,854 B2
(45) Date of Patent: Oct. 18, 2011

(54) STEERING DATA UNITS TO A CONSUMER

(75) Inventors: Anil Vasudevan, Portland, OR (US);
Partha Sarangam, Portland, OR (US);
Ram Huggahalli, Mesa, AZ (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1054 days.

(21) Appl. No.: 11/864,645

(22) Filed: Sep. 28, 2007

(65) Prior Publication Data
US 2009/0089505 A1  Apr. 2, 2009

(51) Int. Cl.
*G06F 13/00* (2006.01)
(52) U.S. Cl. ............... 710/33; 711/118; 364/49.16
(58) Field of Classification Search .............. 710/33
See application file for complete search history.

(56) References Cited

U.S. PATENT DOCUMENTS

| 7,802,073 B1 * | 9/2010 | Cheng et al. ............ 712/10 |
| 2005/0132102 A1 * | 6/2005 | Huggahalli et al. ........ 710/36 |
| 2006/0112227 A1 * | 5/2006 | Hady et al. ............. 711/130 |
| 2006/0153215 A1 * | 7/2006 | Cornett et al. ........... 370/412 |
| 2008/0263339 A1 * | 10/2008 | Kriegel et al. ........... 712/228 |

* cited by examiner

*Primary Examiner* — Alford Kindred
*Assistant Examiner* — Brooke Dews
(74) *Attorney, Agent, or Firm* — Blakely, Sokoloff, Taylor & Zafman LLP

(57) ABSTRACT

A computer system may comprise a second device operating as a producer that may steer data units to a first device operating as a consumer. A processing core of the first device may wake-up the second device after generating a first data unit. The second device may generate steering values after retrieving a first data unit directly from the cache of the first device. The second device may populate a flow table with a plurality of entries using the steering values. The second device may receive a packet over a network and store the packet directly into the cache of the first device using a first steering value. The second device may direct an interrupt signal to the processing core of the first device using a second steering value.

20 Claims, 3 Drawing Sheets

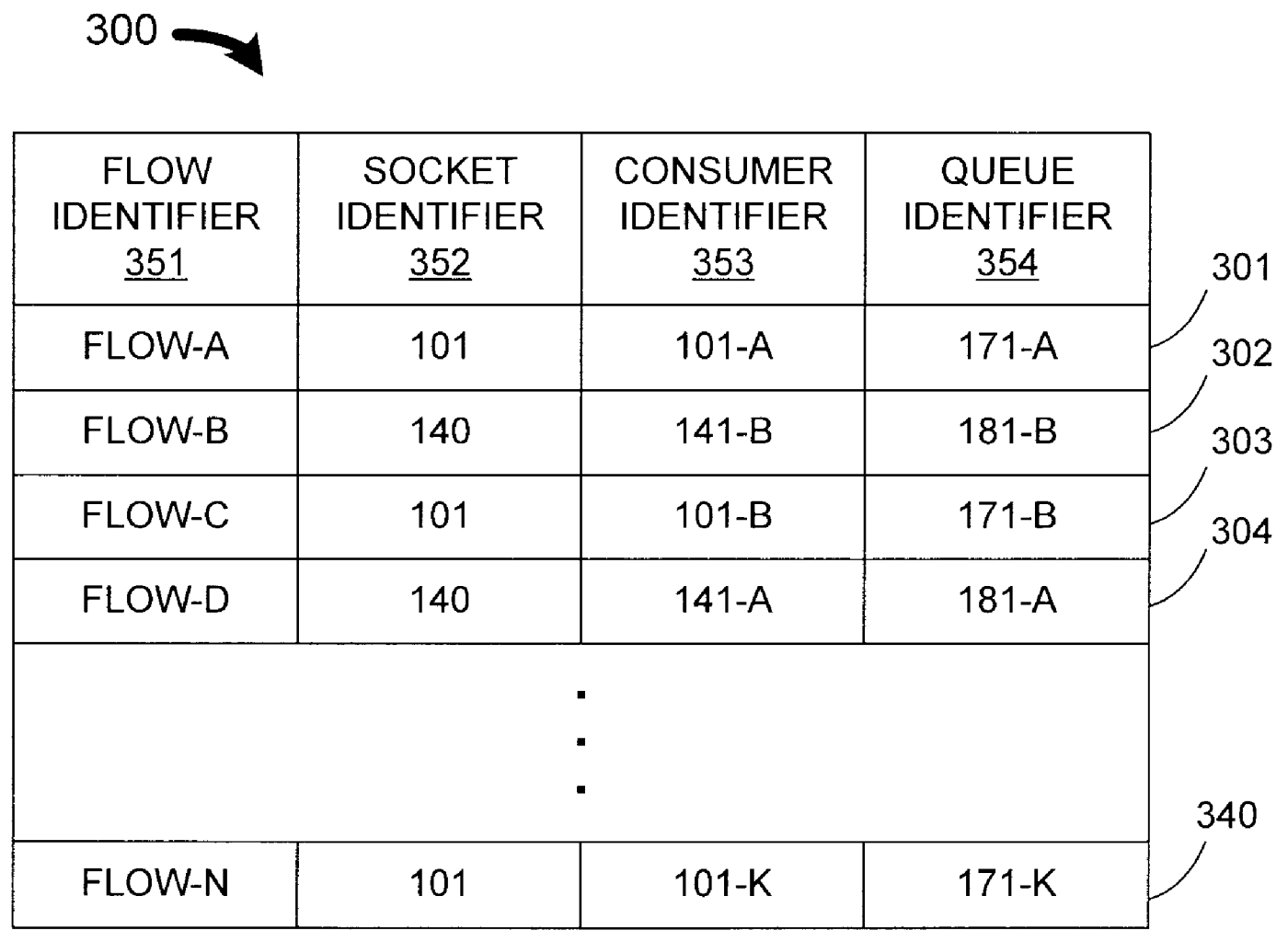

| FLOW IDENTIFIER 351 | SOCKET IDENTIFIER 352 | CONSUMER IDENTIFIER 353 | QUEUE IDENTIFIER 354 |
|---|---|---|---|
| FLOW-A | 101 | 101-A | 171-A |
| FLOW-B | 140 | 141-B | 181-B |
| FLOW-C | 101 | 101-B | 171-B |
| FLOW-D | 140 | 141-A | 181-A |
| ... | ... | ... | ... |
| FLOW-N | 101 | 101-K | 171-K |

FIG. 3

STEERING DATA UNITS TO A CONSUMER

BACKGROUND

A processing unit may comprise multiple processing cores, which may increase the performance of the processing unit. Also, as the data transfer speeds increase (e.g., 10 Giga-bit per second), the processing of network stack may consume higher processing cycles of the processing unit and bandwidth of internal buses such as a coherent bus, a front side bus, and a memory bus.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 illustrates a flow table used to steer the data units to the consumer.

DETAILED DESCRIPTION

The following description describes steering data units to a consumer. In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
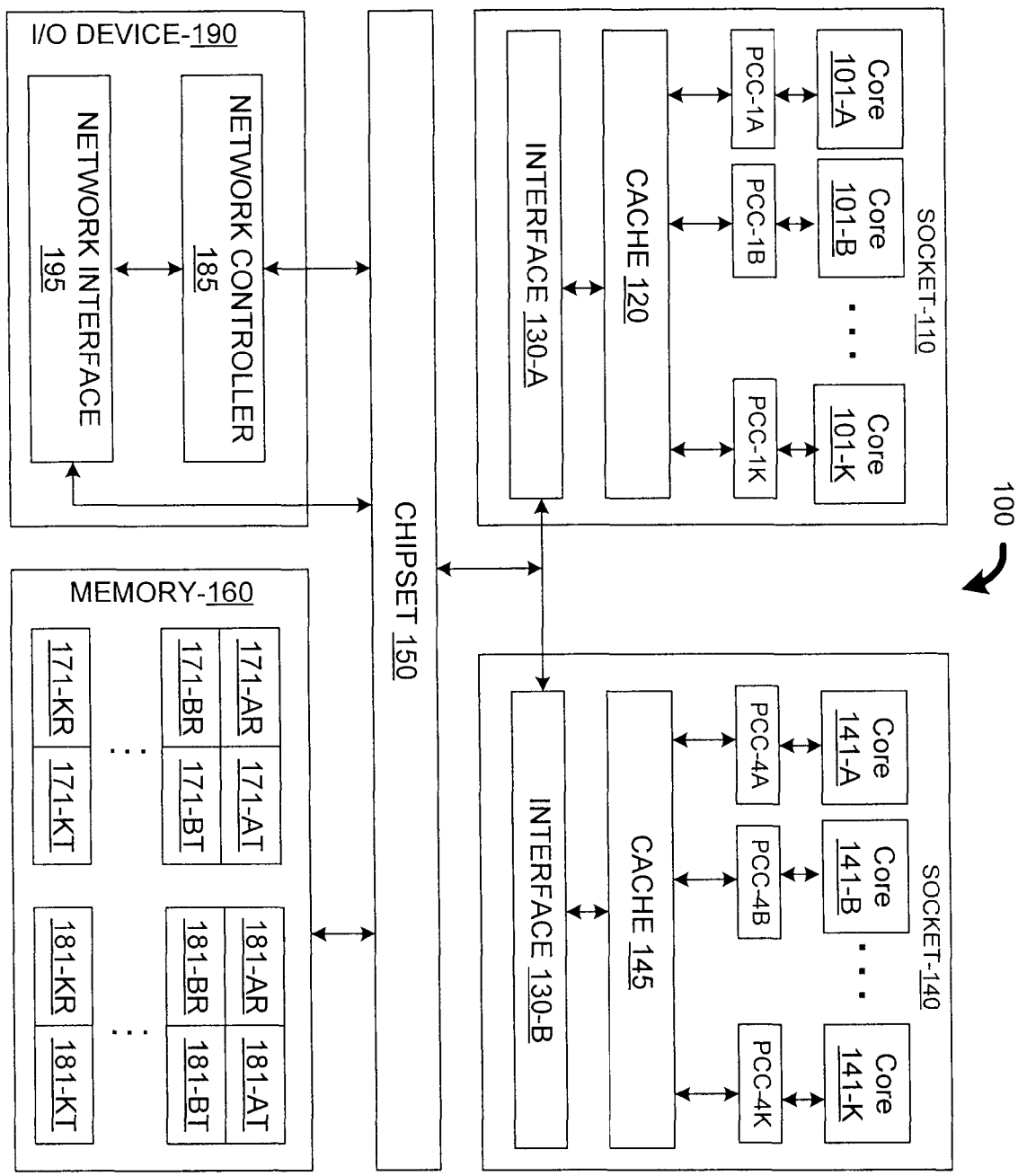
FIG. 1 illustrates an embodiment of a computing platform 100.

An embodiment of a computing platform 100 is illustrated in FIG. 1. The computing platform 100 may comprise a socket 110 and 140, a chipset 150, a memory 160, and an I/O device 190.

In one embodiment, the chipset 150 may comprise one or more integrated circuits or chips that couple the sockets 110 and 140, the memory 160, and the I/O device 190. In one embodiment, the chipset 150 may comprise controller hubs such as a memory controller hub and an I/O controller hub to, respectively, couple with the memory 160 and the I/O device 190. In one embodiment, the chipset 150 may comprise Intel® chipsets.

The memory 160 may store data and/or software instructions that the socket 110, 140, chipset 150, the I/O device 190, or any other devices of the computing platform 100 may access and perform operations. In one embodiment, the memory 160 may store a flow table created by the I/O device 190. In one embodiment, the memory 160 may comprise transmit queues 171-AT to 171-KT and 181-AT to 181-KT and receive queues 171-AR to 171-KR and 181-AR to 181-KR. In one embodiment, each of the queues 171 and 181 may be, respectively, associated with the cores 101 and 141. In one embodiment, the queue 181-BT may be used to store the data units generated by the core 141-B while transmitting the data units. In one embodiment, the queue 181-BR may be used to store the packets received over a network before the core 141-B retrieves the packets. In one embodiment, the memory 160 may comprise different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in computer system 100.

In one embodiment, the socket 110 may comprise cores 101-A to 101-K coupled to per core caches (PCC) PCC-1A to PCC-1K, a shared cache 120, and an interface 130-A. In one embodiment, the socket 140 may also comprise multiple cores 141-A to 141-K coupled to per core caches (PCC) PCC 4A to PCC 4K, a cache 145, and an interface 130-B. In one embodiment, the interface 130-A and 130-B may couple the socket 110 and 140 to each other and to the chipset 150 of the computer system 100. In one embodiment, the socket 110 and 140 may comprise the shared cache 120 and 145, which may comprise fast memory with lower access times. In one embodiment, the sockets 110 and 140 may be coupled by a coherent bus.

The core 101-A may support an interrupt service routine (ISR), a driver, and a network stack and the core 141-B may support an application such as file transfer protocol (ftp), or e-mail, or Telnet. The I/O device 190 may receive data units and may store the data units in the memory 160. The I/O device 190 may also interrupt the core 101-A, which may process the interrupt, perform network stack processing, and signal the core 141-B. The core 141-B may complete additional processing including the network processing before retrieving the data units stored in the memory 160 in response to receiving the signal from the core 101-A. The signaling between the cores 101-A and 141-B and associated data movement that may be caused due to shared data elements updated in the core 101-A and subsequently accessed by the core 141-B may consume bandwidth of the buses and processing cycles of the cores 101-A and 141-B. Also, retrieval of data units from the memory 160 may consume processing cycles of the core 141-B and bandwidth of the memory and the coherent bus. Also, movement of data between the cores 101 and 141 may cause cache pollution due to cache lines being shared. Such an approach may cause sub-optimal performance of the computer system 100.

To improve the performance of the computer system 100, in one embodiment, each of the cores 101 and 141 may support interrupt service routines, drivers, protocol stacks, and applications. In one embodiment, the core 141-B may support a protocol stack such as a TCP/IP stack, UDP, VLAN, and applications such as e-mail, ftp, telnet, audio, and video. In one embodiment, the cores 101 and 140 of the sockets 110 and 140 may perform dual roles of a consumer and a producer. In one embodiment, the core 141-B may be referred to as a consumer if the core 141-B consumes the data units or the packets produced by a producer such as the I/O device 190. In one embodiment, the core 141-B may be referred to as a producer if the core 141-B generates the data units for the consumption of a consumer such as the I/O device 190.

In one embodiment, the cores 101 and 141 may support an operating system, which may schedule the threads associated with the applications on the cores where the thread was previously scheduled. In one embodiment, such an approach may be based on a scheduling property that the probability of the data structures, accessed by the applications, being resident in the shared cache 120 and 145 is high. In one embodiment, application targeted routing may use the scheduling property to steer the data units to a consumer. In one embodiment, the cores 101 and 141 may support a direct I/O (DIO) read and a direct I/O (DIO) write transaction.

In one embodiment, the core 141-B, while operating as a producer, may wake-up the I/O device 190. Before waking-up the I/O device 190, the core 141-B may generate one or more data units. In one embodiment, the data unit may comprise a descriptor, a header, and a payload. In one embodiment, the descriptor may comprise control information such as the pointers to the header and the payload and actions that may be carried out on the header and the payload. In one embodiment, the descriptor may also comprise control information, which may indicate the storage area from which data units may be read and written into. In one embodiment, after creating the descriptor, the driver supported by the core 141-B may wake-up the I/O device 190.

In one embodiment, the core 141-B may store the data units in the per core cache PCC-4B associated with the core 141-B. In one embodiment, the identifier of a per-core cache in which the data units are stored and the identifier of the socket supporting the per-core cache may be used by the I/O device 190 to generate one or more steering values. In one embodiment, the steering values may comprise a core identifier (CID) element and a socket identifier (SID) element. In one embodiment, the socket identifier (SID) element may be used to identify the shared cache 145 from which data units may be read and into which the packets may be stored by the I/O device 190. In one embodiment, the core identifier (CID) element may be used to identify the core 141-B, which may be interrupted after storing the packets, directly, into the shared cache 145 or the per core cache PCC-4B. In other embodiment, the core 141-B, while generating the data units, may also configure the steering values and associate the steering values with the data units.

In one embodiment, the core 141-B may generate the header portion in addition to generating the descriptor portion and payload portion of the data unit. In one embodiment, the header portion may comprise transmit flow information. In one embodiment, the transmit flow information may comprise a source address and a destination address. In other embodiment, the transmit flow information may comprise a source port identifier and a destination port identifier. In one embodiment, the header portion may be generated using a TCP/IP, or a UDP, or an asynchronous transfer mode (ATM), or such similar other formats.

In one embodiment, the core 141-B may also generate a receive flow information, which may comprise pointers indicating to the storage area into which the receive data or packets may be stored. In one embodiment, the interrupt service routines (ISR) supported by the core 141-B may generate the receive flow information. In one embodiment, the receive flow information may comprise pointers, which may indicate the storage area for storing the packets received over the network. In one embodiment, the receive flow information may comprise a pointer pointing to the queue 181-BR to store the packets. In one embodiment, the association between the core 141-B and the queue 181-BR may be used to steer an interrupt signal to the core 141-B.

In one embodiment, the core 141-B, while operating as a consumer, may receive an interrupt signal from the I/O device 190. In one embodiment, the core 141-B may retrieve the packets stored in the shared core 145 or the per core cache PCC-4B in response to receiving the interrupt signal.

In one embodiment, the I/O device 190 may comprise a network device such as a network interface controller (NIC) card. In one embodiment, the I/O device 190 may comprise a network controller 185 and a network interface 195.

In one embodiment, the I/O device 190 may also perform dual roles of a consumer and a producer. In one embodiment, the I/O device 190 may be referred to as a consumer if the I/O device 190 consumes the data units produced by a producer such as the core 141-B. In one embodiment, the I/O device 190 may be referred to as a producer if the I/O device 190 generates the data units for the consumption of a consumer such as the core 141-B.

In one embodiment, the network interface 195 may receive data units from the queues 171 and 181 and may transfer the data units over the network while the I/O device 190 operates as a consumer. In one embodiment, the I/O device 190, while operating as a producer, may steer the packets received over the network to a core using the flow table entries. In one embodiment, the network interface 195 may receive packets over the network and store the packets into the queue 171 or 181 specified by the network controller 185. In one embodiment, the network interface 195 may provide physical, electrical, and protocol interface between the computer system 100 and the network.

In one embodiment, the I/O device 190, while operating as a consumer, may wake-up in response to receiving a wake-up signal from the core such as the core 141-B. In one embodiment, the network controller 185 may initiate a DIO read transaction after waking-up. In one embodiment, the DIO read transaction may be directed at addresses comprising data units created by the core 141-B, which may be present in the shared core 145 or the PCC-4B based on the source (core 141-B) of generation of the wake-up signal. In one embodiment, the network controller 185 may retrieve the descriptor portion. In one embodiment, the network controller 185 may decode the descriptor portion. In one embodiment, the descriptor portion may comprise pointers to the header portion and the payload portion.

In one embodiment, the network controller 185 may perform a DIO read transaction to read the header portion and the payload portion. In one embodiment, if the data units happen to reside in the PCC-4B or the shared cache 145, the DIO read transaction may return along with the data, the CID, and the SID values to the network controller 185. In one embodiment, the network controller 185 may check for the presence of the data units in the other per core caches before generating the steering values. In one embodiment, the network controller 185 may generate the steering values using one or more indicators in the data unit. In one embodiment, the steering values may comprise the CID element and the SID element. In one embodiment, the network controller 185 may generate the CID element using the information of the location from which the data unit was read. In one embodiment, the network controller 185 may generate the CID element to equal 141-B if the data unit was read from the PCC-4B as the PCC-4B is associated with the core 141-B. In one embodiment, the network controller 185 may also generate the SID element to equal 140 as the PCC-4B is supported by the socket 140. In one embodiment, the network controller 185 may extract the transmit flow information from the header portion and associate the flow information with the CID element and the SID element.

In one embodiment, the network controller 185 may also generate a queue identifier element associated with the CID element. In one embodiment, the queue identifier element may represent the core that is to be interrupted. In one embodiment, the network controller 185 may interrupt the core 141-B and may retrieve the receive flow information by performing a DIO read transaction. In one embodiment, the receive flow information may comprise a descriptor. In one embodiment, the descriptor may comprise a pointer to indicate the storage area into which the packets received over the network may be stored.

In one embodiment, the network controller 185 may receive a pointer pointing to the PCC-4B or the shared cache 145 as the storage area for storing the packets. In one embodiment, the network controller 185 may use the pointer information in the descriptor to map the interrupt or a queue identifier to the CID element. In one embodiment, the network controller 185 may map the queue 181-B provisioned to store packets destined to the core 141-B and the CID element 141-B. In one embodiment, the network controller 185 may create a flow table 300 comprising association between the CID element, the SID element, the flow identifier element, and the queue identifier. In one embodiment, the network controller 185 may store the flow table in the memory 160. In one embodiment, the network controller 185 may also store the flow table in a memory area within the local memory of the network controller 185. In other embodiment, the network controller 185 may extract the steering values configured by the core 141-B in the descriptor.

In one embodiment, while operating as a producer, the network controller 185 may extract the flow information embedded in the packets received by the network interface 195 over the network. In one embodiment, the network controller 185 may compare the flow information embedded in the data units with the flow identifier field of the flow table 300. In one embodiment, the flow table 300 may comprise a list of flow identifiers and each flow identifier may be associated with a SID, a CID, and a queue identifier.

In one embodiment, the network controller 185 may store the packets in a queue identified by the queue identifier. In one embodiment, the network controller 185 may store the packets in the queue 181-BR if the flow information in the packet matches with the flow identifier that comprise 181-BR as the queue identifier. In one embodiment, the network controller 185 may transfer the packets to the shared cache 145 or the PCC-4B using the SID element associated with the matching entry. In one embodiment, the network controller 185 may steer the data units to an appropriate core based on the steering values, and the flow identifiers.

In one embodiment, the network controller 185 may perform a DIO write transaction, which may directly write the data units into the shared cache 145 or the PCC-4B. In one embodiment, the packets written from the network controller 185 may be stored in the shared cache 145 in the "M" state of the MESI protocol thus, maintaining coherency for the DIO write transactions.

In one embodiment, the network controller 185 may interrupt the core 141-B after storing the packets into the shared cache 145 or the PCC-4B. In one embodiment, the network controller 185 may use the CID element to determine the core to be interrupted.

Figure 2:
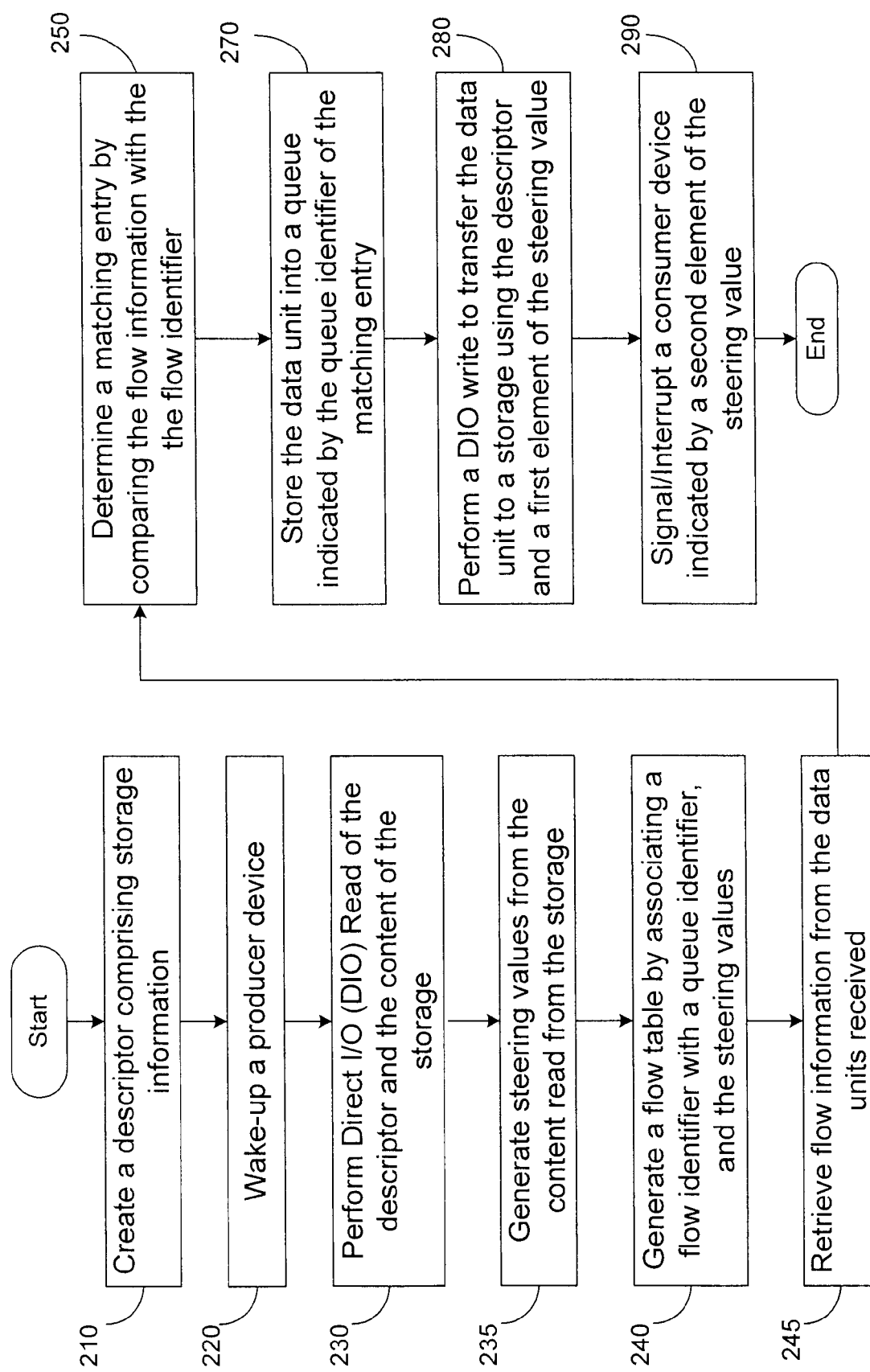
FIG. 2 illustrates an embodiment of an operation of the computing platform 100, which may steer the data units to a consumer.

An embodiment of an operation of the computing system 100, which may steer the data units to an appropriate core is illustrated in FIG. 2. In block 210, the producer such as the core 141-B may create a descriptor comprising storage information. In one embodiment, a driver supported on the core 141-B may create a descriptor. In one embodiment, the descriptor may comprise the storage information such as the pointers, which point to the storage area from which the data units may be retrieved and into which the packets may be stored.

In block 220, the producer (core 141-B) may wake-up the consumer (I/O device 190) by sending a wake-up signal. In block 230, the consumer such as the I/O device 190 may perform DIO read to read the descriptor and the contents of the storage. In one embodiment, the I/O device 190 may read the descriptor, which may be resident in the shared cache 145 or the PCC-4B. In one embodiment, the I/O device 190 may read the contents of the descriptor from the shared cache 145 or the PCC-4B.

In block 235, the consumer such as the I/O device 190 may generate the steering values from the data unit read from the cache of the producer. In one embodiment, the data unit may be passed down to the consumer as a result of the DIO read transaction. In one embodiment, the steering values may comprise a socket identifier (SID) element and a core identifier (CID) element. In other embodiment, the consumer such as the core 141-B may configure the steering values and may associate the steering values with the data units. In one embodiment, the steering values may comprise the socket identifier (SID) element and the core identifier element (CID). For example, the CID may equal 141-B and SID may equal 140.

In block 240, the consumer such as the network controller 185 of the I/O device 190 may generate a flow table 300 by associating a flow identifier with the steering values and the queue identifier. In one embodiment, a queue identifier, a socket identifier, and a core identifier element may be associated with each flow identifier.

An embodiment of a flow table 300 generated by the consumer, as described in block 240, is depicted in FIG. 3. In one embodiment, the flow table 300 may be populated by the network controller 185 of the I/O device 190. In one embodiment, the flow table 300 may comprise a flow identifier 351, a socket identifier 352, a consumer identifier 353, and a queue identifier 354. In one embodiment, the table 300 may comprise rows 301 to 340. In one embodiment, the row 301 is shown comprising (Flow-A, 110, 101-A, and 171-A), row 302 comprises (Flow-B, 140, 141-B, and 181-B), row 303 comprises (Flow-C, 101, 101-B, and 171-B), row 304 comprises (Flow-D, 140, 141-A, and 181-A), and row 340 comprises (Flow-E, 101, 101-K, and 171-K).

In block 245, the I/O device 190 may retrieve flow information from a received packet. In one embodiment, the I/O device 190 may switch to a producer mode of operation. In one embodiment, the I/O device 190 may extract the flow information embedded in the packet.

In block 250, the producer may determine the matching entry by comparing the flow information of the packet with the entries in the flow identifier 351. In one embodiment, the flow information of the packet may relate to the flow identifier 'Flow-B' in the table 300. In one embodiment, the producer may determine that the entry in the row 302 is the matching entry as the flow information of the packet matches with the flow identifier 'Flow-B' of the row 302.

In block 270, the producer may store the payload of the packet into a queue identified by the queue identifier 355 of the matching entry in row 302. In one embodiment, the queue identifier field of the matching entry in row 302 may equal 181-BR.

In block 280, the producer may perform a DIO write transaction to transfer the payload of the packet to a storage such as the shared cache 145 or the PCC-4B. In one embodiment, the producer may use the first steering element (entry in socket identifier 352), which may equal 140 to recognize the shared cache 145 of the socket 140. In one embodiment, the queue 181-BR may be linked or paired with the socket 140 or the core 141-B such that the payload in the queue 181-BR may be transferred to the shared cache 145 or the PCC-4B.

In block 290, the producer may interrupt the consumer based on the second steering element (entry in core identifier 353), which may be equal to 141-B. In one embodiment, the entries of the core identifier 353 may indicate the core which is to be interrupted. After receiving the interrupt signal, the core 141-B may service the ISR and retrieve the payload from the shared cache 145 or the PCC-4B.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a computing system, comprising:
    retrieving a descriptor, in an input-output device, in response to the input-output device receiving a wake-up signal,
    populating a flow table with a plurality of entries in the input-output device, wherein the plurality of entries is generated using steering values, wherein the steering values are generated using a first data unit directly read from a cache coupled to a processing core provided within a socket, wherein the cache is identified by the descriptor,
    storing a second data unit, received over a network, directly into the cache, wherein the cache is identified by the steering values,
    generating an interrupt signal directed to the processing core, wherein the processing core is identified using the steering values, and
    retrieving the second data unit in response to receiving the interrupt signal, wherein the second data unit is steered to the processing core, processing an application, based on the steering values.

2. The method of claim 1, wherein the descriptor comprises a pointer to the cache from which the first data unit is to be retrieved directly.

3. The method of claim 2 comprises generating the steering values using the first data unit, wherein the first data unit is retrieved directly from the cache by performing a direct read operation of the contents of the cache.

4. The method of claim 2 comprises storing the second data unit directly into the cache by performing a direct write operation, wherein the cache is identified by the steering value.

5. The method of claim 1, wherein the steering values comprise a first steering value representing socket identifier, wherein the first steering value is to identify the socket, which comprises the cache from which the first data unit is retrieved and the second data unit is stored.

6. The method of claim 1, wherein the steering values further comprise a second steering value representing the processing core, wherein the second steering value is to identify the processing core of the socket that is to handle the interrupt signal.

7. The method of claim 1 further comprises determining a matching entry, wherein the matching entry is determined by comparing the flow information embedded in the second data unit with a flow identifier of the plurality of entries.

8. The method of claim 7 comprises storing the second data unit into a queue identified by a queue identifier, wherein the plurality of entries comprises the queue identifier.

9. The method of claim 8 comprises storing the second data unit directly into the cache from the queue, wherein the second data unit is stored directly into the cache using the steering values.

10. The method of claim 9 comprises retrieving the second data unit from the cache after receiving the interrupt signal, wherein the second data unit is retrieved by the processing core.

11. A system comprising:
    a first device, wherein the first device is to generate a wake-up signal, wherein the first device is to create a descriptor before generating the wake-up signal, and
    a second device coupled to the first device,
    wherein the second device is to retrieve a first data unit directly from the cache of the first device using the descriptor after receiving the wake-up signal,
    wherein the second device is to generate steering values based on the first data unit,
    wherein the second device is to store a second data unit directly into a cache of the first device, wherein the cache of the first device and the first device are identified using the steering values,
    wherein the second device is to generate an interrupt signal directed to a processing core of the first device, wherein the processing core is identified using the steering values,
    wherein the first device is to retrieve the second data unit in response to receiving the interrupt signal, wherein the second data unit is steered to the processing core, processing an application, based on the steering values.

12. The system of claim 11 the first device further comprises a plurality of processing cores in a socket, wherein the processing core of the plurality of the processing cores is to generate the first data unit, wherein the first data unit is to comprise information that is used to generate the steering values.

13. The system of claim 12, wherein the descriptor is to comprise a pointer to the cache from which the first data unit is to be retrieved directly.

14. The system of claim 13, wherein the second device is to
retrieve the first data unit directly from the cache, wherein the first data unit is retrieved from the cache by performing a direct read operation of the contents of the cache, and
store the second data unit directly into the cache, wherein the second data unit is stored into the cache by performing a direct write operation.

15. The system of claim 14 wherein the second device further comprises:
a network interlace to receive the second data unit, and
a network controller coupled to the network interface, wherein the network controller is to determine a matching entry by comparing the flow information embedded in the second data unit with a flow identifier field of a flow table.

16. The system of claim 15, wherein the network controller is to populate the flow table with a plurality of entries using the descriptor and the steering values, wherein the plurality of entries comprise a flow identifier, a first and a second steering element, and a queue identifier.

17. The system of claim 16, wherein the steering values comprise
a first steering element to identify the socket, wherein the socket is to comprise the cache from which the first data unit is retrieved and the second data unit is stored, and
a second steering element to identify the processing core of the socket, wherein the processing core is to handle the interrupt signal.

18. The system of claim 15, wherein the network controller is to store the second data unit into a queue identified by a queue identifier, wherein the plurality of entries comprise the queue identifier.

19. The system of claim 18, wherein the network controller is to store the second data unit directly into the cache, wherein the second data unit is retrieved from the queue identified by the queue identifier.

20. The system of claim 19, wherein the processing core is to retrieve the second data unit from the cache after receiving the interrupt signal.

* * * * *